May 11, 1965 P. A. GUINARD 3,182,600
PUMPS PROVIDED WITH A HELICAL ROTOR OF REVOLUTION AND
A ROTATING OBTURATOR PLATE MESHING WITH THIS ROTOR
Filed May 13, 1963 4 Sheets-Sheet 1
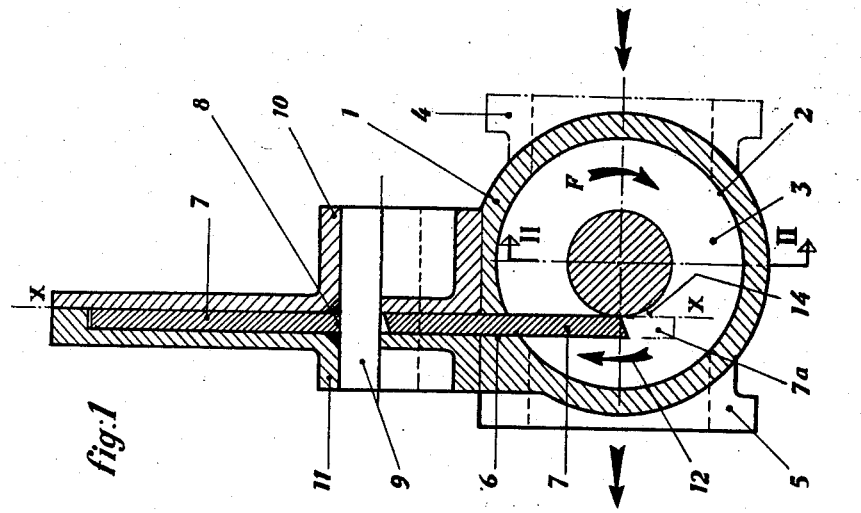
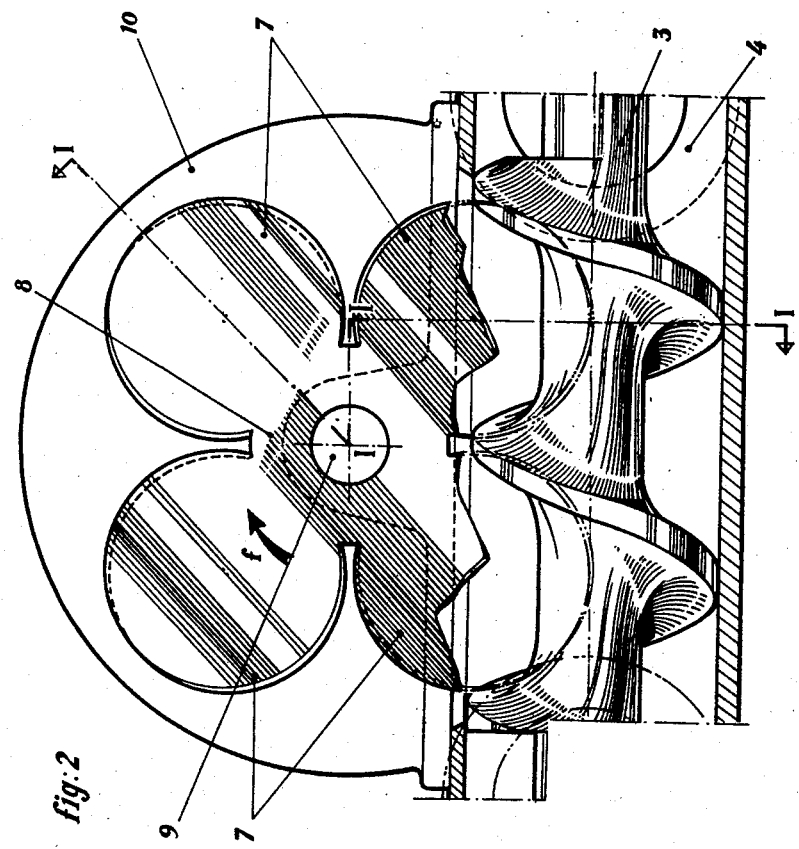

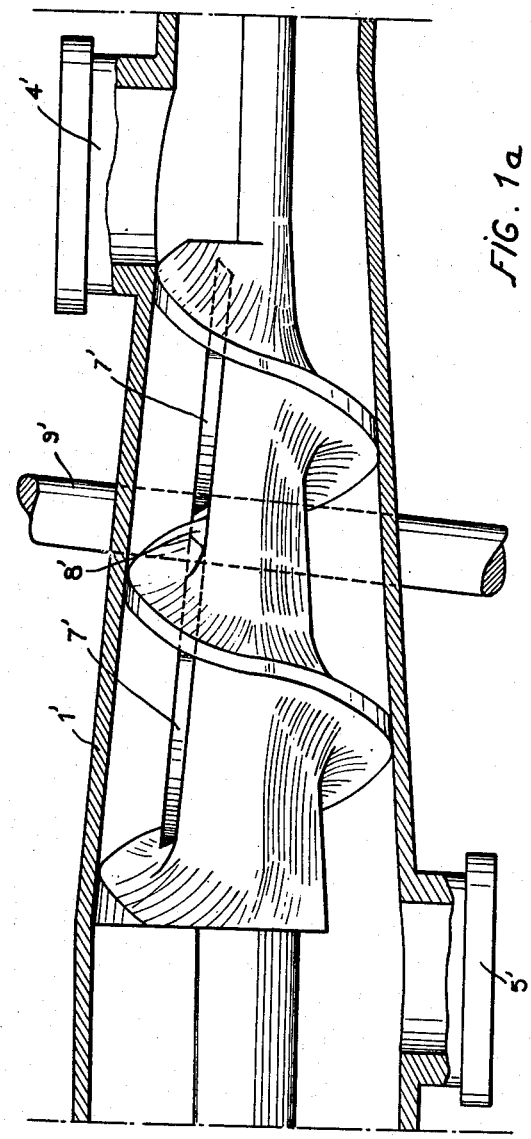

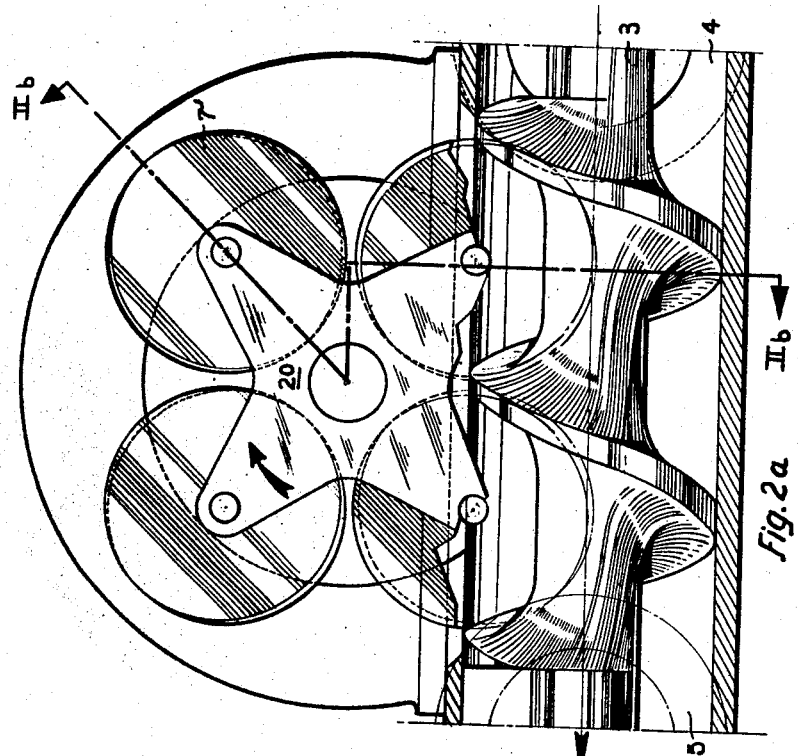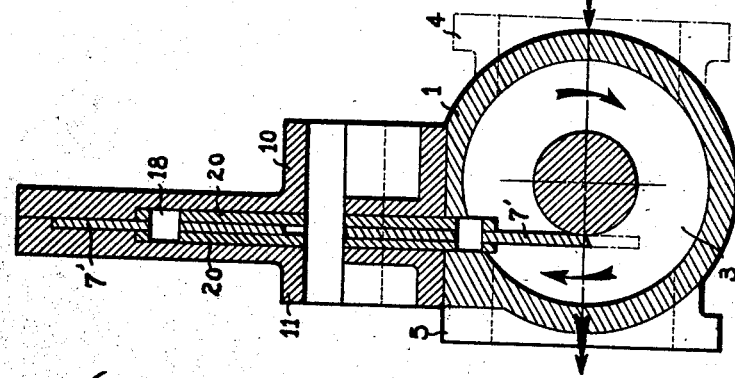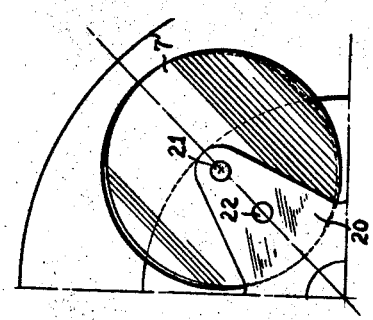

United States Patent Office 3,182,600
Patented May 11, 1965

3,182,600
PUMPS PROVIDED WITH A HELICAL ROTOR OF REVOLUTION AND A ROTATING OBTURATOR PLATE MESHING WITH THIS ROTOR
Paul André Guinard, 6 Rue Montesquiou, Saint-Cloud, Seine-et-Oise, France
Filed May 13, 1963, Ser. No. 280,011
Claims priority, application France, May 15, 1962, 897,557
9 Claims. (Cl. 103—125)

The present invention relates to a pump of the type comprising a helical rotor and at least one rotating obturator plate acting as a piston and meshing with said rotor. Pumps of this type are already known in which the rotor is constituted by a cylindrical core provided with one or several helical grooves, while the obturator or the obturators are each constituted by a disk having at its periphery several lobes the shape of which corresponds to the shape of the section of the helical groove of the rotor such that said obturator is engaged with the rotor by engaging said groove.

In these known pumps, the disk provided with lobes and forming the obturator or piston is disposed in a plane passing through the axis of the rotor or in a plane oblique with respect to this axis but always intersecting this axis at the center of the rotor and thereby constituting a plane of symmetry of the rotor. The result of this arrangement is that the pumped fluid exerts on that part of the lobe engaged in the helical groove of the rotor, a pressure which can bend the lobe and bring about objectionable deformations thereof resulting in a lack of fluid tightness.

To obviate this defect, it is necessary to furnish the obturator with a significant thickness to enable it to resist the pressure. However, the increase of the thickness of the obturator results in a reduction of the volume of the compression chamber which is defined in the helical groove of the rotor by two successive lobes which are simultaneously engaged in this groove.

The pump according to the present invention overcomes this defect. It is characterized in that the obturating disk or piston is arranged in a plane which is laterally shifted with respect to the longitudinal axis of the rotor while the radius of said disk is greater than the distance between its axis and the axis of said core so that the inner face of the lobes always remains tangent to the core of the rotor during their engagement in the groove of the rotor.

As a result, the pressure generated by the pumped fluid urges that part of the lobe engaged in the groove against the core of the rotor; the lobes being thus supported by the core during their rotation and the distortion thereof is prevented while the fluid tightness obtained by the contact is increased, thereby allowing a thin disk to be used, and the lost space to be considerably reduced.

In the case of a cylindrical rotor, the plane of the obturator is parallel to the longitudinal axis of the rotor, while, in the case of a rotor with a conical core, the obturator is tangent to the conical core along a generatrix of said core and is oblique with respect to the axis of said core.

The invention also covers the following features applied separately or in any combination:

(a) A single obturator which engages two helical rotors, rotating in opposite directions.

(b) Two obturators which are arranged on both sides of the core of the screw and are axially shifted by a distance corresponding to a half screw-pitch of the thread of the core.

(c) The lobes, which can have any desired shape, can be constituted by disks, fixedly or rotatingly mounted on a plate which is trunnioned on a fixed axis, these disks having in such case, a small thickness.

(d) If the thickness of the disks forming the lobes is of several millimeters, it is advantageous to produce them by cutting a cylinder along parallel planes oblique with respect to the axis of the cylinder.

(e) The plate and the lobes can be made in one piece and cut from a single metal sheet.

The invention also comprises other features which will appear in the following description made with reference to the annexed drawing containing embodiments given by way of example only.

In the drawing:

FIGURE 1 is a cross-section of a pump according to the invention taken along the broken line I—I—I—I of FIGURE 2, as seen in the direction of the arrows.

FIG. 1a shows in longitudinal section an alternative embodiment of the invention.

FIG. 2a shows a further embodment of a detail of the pump of FIG. 2;

FIG. 2b is a cross-section through the pump of FIG. 2a along the line IIb—IIb;

FIG. 2c is a partial longitudinal section showing a modified construction;

FIGURE 3 is an axial, longitudinal section of the rotor of FIG. 1, showing particularly the sections of the grooves of the rotor;

Figure 4:
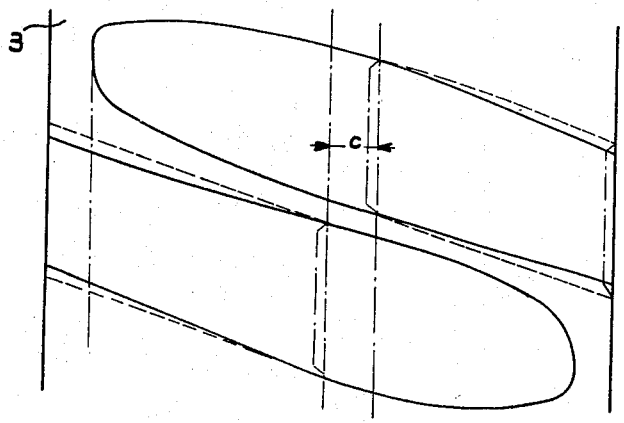
FIGURE 4 is a developed plan view of the rotor showing the contact zones of the lobes of the obturator with this rotor.

The pump, illustrated in a simplified way in FIGS. 1, 2, comprises a housing 1 provided with a cylindrical bore 2 in which moves a helical rotor or screw 3, the profile of which is variable, as it will be indicated hereinafter. The housing 1 is provided with an intake bore 4, a discharge bore 5 and a longitudinal slot 6 having a small width for the passage of a disk 8 in which are formed the lobes 7. These lobes 7 have oblique or chamfered edges forming a cylindrical surface having an axis oblique with respect to the axis of the disk 8. A spindle 9 integral with the disk 8 rotates in a casing constituted by a rear flange 10 and a front flange 11 which are fixed to one another and to the housing 1 by means of screws and the like.

The profile of the threads formed on the rotor 3 corresponds to the trace of the lobes, said lobes being driven in rotation around the spindle 9 in the direction of the arrow F by the rotation of the screw 3 in the direction of the arrow F.

According to the present invention, the plane XX of the inner face of the disk 8 is laterally shifted with respect to the longitudinal axis of the rotor or screw 3, so as to be tangent to the core of said screw. The radius of disk 8 being to this effect greater than the distance between the axis of spindle 9 and the axis of core 3.

In operation, the pumped fluid, which is compressed at zone 12 in front of the lobes 7 tends to urge these lobes against the core, thus allowing rather thin disks to be used while the useful space on either side of the lobes 7 is increased. In addition, it becomes possible to pump liquids containing solid particles in suspension particularly solutions of paper pastes of a very high concentration without jamming the movable parts. In the zone 14, the jamming is necessarily eliminated at each passage of a lobe, due to the progressive escapement of this lobe after its deepest position in the rotor 3 as at 7a in FIGURE 1 in dotted outline.

The fluid tightness between the lobes 7 in the linear zone in the plane XX can be improved laterally owing to the beveled shape of the edge of these lobes.

Figure 3:
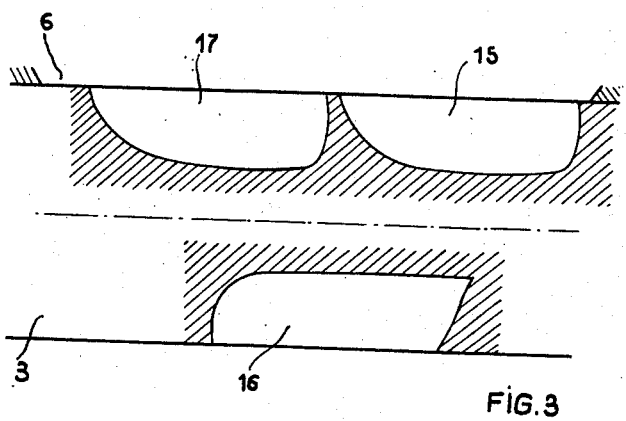
FIGURE 3 shows the body of the pump, in elevation and partly in section along the line II—II of FIGURE 1, the front part of the housing of the distributor being removed.

FIGURE 3 shows the profiles of the helical groove of the rotor, when starting from an initial position indicated at 15, then after a rotation of 180° at 16 and finally after 360° at 17.

FIGURE 4 is a transversally developed plan view of the rotor, showing the trace of the lobes and particularly the overlapping C which constitutes the tightness safety at the passing from one lobe to the next lobe.

The circular shape of the lobes 7 allows the cutting of the screw to be carried out according to a standard process, by a milling or by casting.

In the case when the lobes have another shape, the cutting of the screw may be performed by means of cutters having the shape of the lobes of the obturator and generating complex helical surfaces.

The form of embodiment above described has been given only by way of example. Generally speaking, any modification which does not change the above mentioned principal features remains included in the scope of the present invention.

Figure 5:
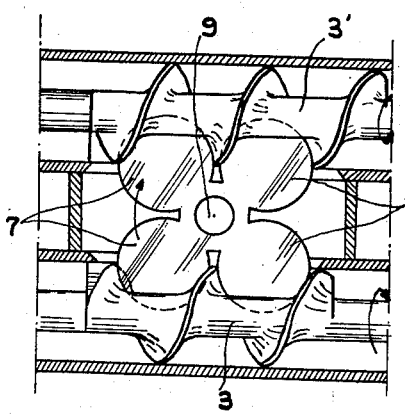
FIGURES 5 and 6 show schematically in elevation two alternatives of the pump according to the invention respectively.

It is also possible to use, with a single disk, two helical rotors rotating in opposite directions and symmetrically disposed on both sides of the axis of the disk (FIG. 5).

Figure 6:
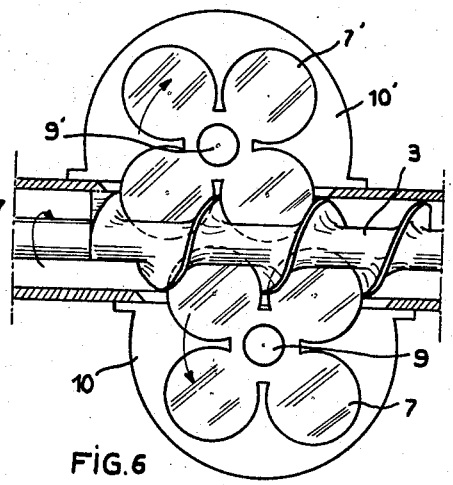

Also there can be provided two disks disposed on either side of the core of the screw and axially shifted by a distance corresponding to a half screw-pitch (FIG. 6).

As diagrammatically shown in FIG. 1a, the core 3' provided with the helical groove may be conical, in which case the piston forming disk 8' carried by axis 9' is still laterally shifted with respect to the axis of the core but arranged obliquely with respect to the axis thereof in order to be located tangentially to said conical core along a generatrix thereof.

As further shown in FIG. 2a the lobes 7' may be formed by thin circular disks secured to a common center plate 20 near its periphery. The lobes 7' may be rotatably secured to the center plate 20 by means of pivots 18 which rotatably support the lobes 7' at the centers thereof as shown in FIG. 2a. Alternatively, the lobes 7' may be fixedly secured to the plate 20 by pins 21, 22 as shown in FIG. 2c.

What is claimed is:

1. A pump comprising a rotor including a core and a thread on said core defining a helical groove, a housing having opposite ends, said core being mounted in the housing for rotation about an axis, a suction opening provided at one of the ends of said housing and a discharge opening provided at the other of the ends, at least one planar disk extending into said housing and constituting a piston, said disk including flat lobes peripherally mounted thereon and extending outwardly in the plane of the disk normal to the axis of rotation thereof, said lobes being positioned on the disk to successively engage the thread on said core by entering into said groove of the rotor, and a casing in which said shaft is trunnioned and comprising two flanges connected to said housing and between which said disk is mounted, said disk being laterally displaced with respect to the axis of the core to be arranged in a plane in which the lobes are laterally tangent to said core, said disk having a radius greater than the distance between the axis of the shaft carrying said disk and the axis of the rotor, such that the inner face of at least one of the lobes on the said disk always remains in lateral sealing contact against said core during rotation of the disk.

2. A pump as claimed in claim 1 wherein said rotor and core are cylindrical, and said housing in which the rotor is mounted is also cylindrical.

3. A pump as claimed in claim 1 wherein said rotor and core are conical, and said housing in which the rotor is mounted is also conical.

4. A pump as claimed in claim 1 wherein said lobes each have a beveled edge constituting a portion of a cylindrical surface having an axis obliquely arranged with respect to the plane of the disk to cause the edges to sealingly engage the surface of the threads bounding the helical groove of the rotor.

5. A pump as claimed in claim 1 comprising a second rotor and housing identical to the first said rotor and housing and spaced therefrom such that the lobes of the disk engage both said rotors simultaneously, said rotors being driven in opposite directions.

6. A pump as claimed in claim 1 comprising a second disk and casing identical to the first said disk and casing and aixally spaced therefrom on the opposite side of the rotor with the lobes of the disk each respectively engaged with the rotor.

7. A pump as claimed in claim 1 wherein the lobes of the disk have a circular outline.

8. A pump as claimed in claim 1 wherein said disk includes a center plate, said lobes being individual thin circular disk elements rigidly secured to said common center plate.

9. A pump as claimed in claim 1 wherein said disk comprises a center plate, said lobes being individual thin circular disk elements, and means rotatably securing the disk elements to the center plate adjacent to the periphery thereof.

References Cited by the Examiner

UNITED STATES PATENTS

| 17,516 | 6/57 | Ramsden | 103—125 |
|---|---|---|---|
| 616,522 | 12/98 | Brown | 91—85 |
| 1,164,546 | 12/15 | Neuland | 123—13 |
| 1,723,157 | 8/29 | Guttinger | 103—125 |
| 1,785,140 | 12/30 | Morris | 130—125 |
| 1,791,047 | 2/31 | Symons | 91—85 X |
| 1,785,140 | 12/30 | Morris | 103—125 |
| 1,989,552 | 1/35 | Good | 230—150 |
| 2,010,797 | 8/35 | Archbold et al. | 91—85 |
| 2,058,230 | 10/36 | Hornbostel | 103—125 |
| 2,500,143 | 3/50 | Biermann | 230—150 |
| 2,716,861 | 9/55 | Goodyear | 103—125 |
| 2,994,276 | 8/61 | Matson | 103—125 |

FOREIGN PATENTS

| 563,334 | 9/23 | France. |
|---|---|---|
| 263,840 | 4/27 | Great Britain. |

KARL J. ALBRECHT, *Primary Examiner.*

WILBUR J. GOODLIN, *Examiner.*